(12) United States Patent
Goetze et al.

(10) Patent No.: US 6,320,274 B1
(45) Date of Patent: Nov. 20, 2001

(54) ONBOARD ELECTRICAL SYSTEM FOR A VEHICLE WITH SWITCH CONNECTIONS BETWEEN ELECTRICAL SUBSYSTEMS

(75) Inventors: Thomas Goetze, Chemnitz; Hans-Peter Johanning, Zell am Main; Heinz Schaefer, Estenfeld, all of (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/580,550

(22) Filed: May 30, 2000

Related U.S. Application Data

(63) Continuation of application No. PCT/DE98/03354, filed on Nov. 16, 1998.

(30) Foreign Application Priority Data

Nov. 27, 1997 (DE) ................................................ 197 52 661

(51) Int. Cl.$^7$ ....................................................... B60L 1/00
(52) U.S. Cl. ................................. 307/9.1; 307/29; 307/85
(58) Field of Search ........................... 307/9.1, 0.1, 10.6, 307/29, 85, 86, 27; 290/22, 46, 31, 402; 322/14, 15, 16; 701/36

(56) References Cited

U.S. PATENT DOCUMENTS

| | | | |
|---|---|---|---|
| 4,672,294 | * | 6/1987 | Norton ................................ 320/17 |
| 4,723,079 | * | 2/1988 | Norton ................................ 307/66 |
| 5,175,439 | * | 12/1992 | Harer et al. ........................ 307/10.1 |
| 5,334,926 | | 8/1994 | Imaizumi ............................. 320/15 |
| 5,998,976 | * | 12/1999 | Steffan ................................ 322/10 |

FOREIGN PATENT DOCUMENTS

| | | |
|---|---|---|
| 37 43 316 A1 | 6/1989 | (DE) . |
| 37 43 317 A1 | 6/1989 | (DE) . |
| 43 10 240 A1 | 10/1993 | (DE) . |

* cited by examiner

*Primary Examiner*—Josie Ballato
*Assistant Examiner*—Sharon Polk
(74) *Attorney, Agent, or Firm*—Sughrue, Mion, Zinn, Macpeak & Seas, PLLC

(57) ABSTRACT

In order to reduce the battery load, a second elevated onboard electrical system voltage is provided at least for high-current consuming components. The voltage is derived from the battery voltage via a step-up switching regulator (SUSR) or is supplied by a starter-generator (SG) via a converter (CONV) in the generator mode of the starter-generator, which is coupled with an internal combustion engine (ICE) of the vehicle. The step-up switching regulator is used for battery supply of a start capacitor (CAP) and the converter is used for triggering of the starter-generator to start the internal combustion engine.

24 Claims, 1 Drawing Sheet

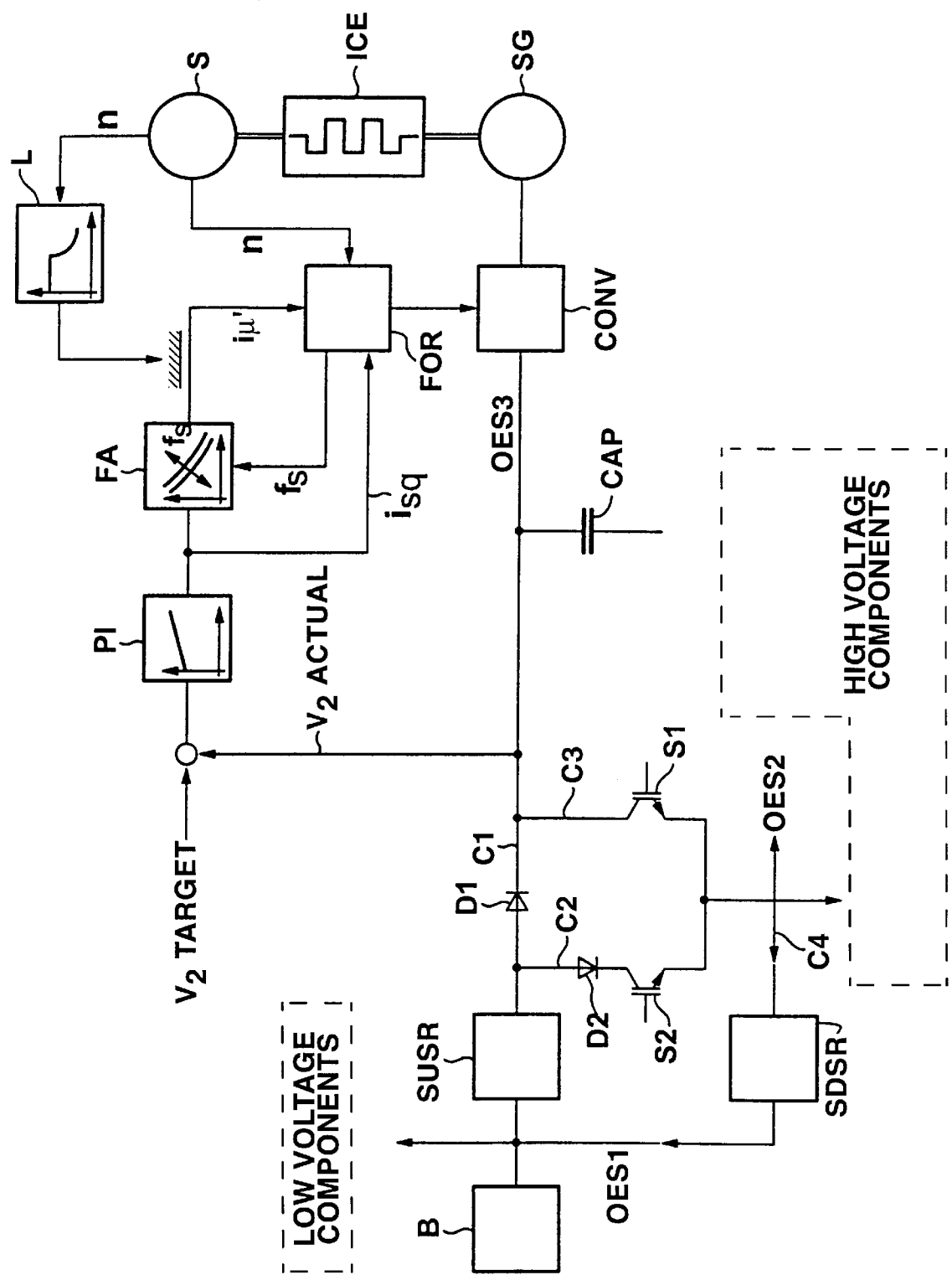

ONBOARD ELECTRICAL SYSTEM FOR A VEHICLE WITH SWITCH CONNECTIONS BETWEEN ELECTRICAL SUBSYSTEMS

This is a Continuation of International Application PCT/DE98/03354, with an international filing date of Nov. 16, 1998, the disclosure of which is incorporated into this application by reference.

FIELD OF AND BACKGROUND OF THE INVENTION

The invention concerns an onboard electrical system for a vehicle. Onboard electrical systems of this kind serve in particular to connect power consuming components to onboard electrical system energy storage, in particular a battery and an onboard electrical system generator of energy, and to a starter-generator which can be coupled to the internal combustion engine of the vehicle. In the event that high-current consuming components are connected to the onboard electrical system as well, it is advantageous, for purposes of minimizing losses, to provide a second voltage for their supply that is higher than a first battery-side voltage.

German Laid-Open Publication DE 37 43 317 A1 describes a vehicle onboard electrical system with a starter-generator that is connected via a pulse-width-modulated inverter and a 300-volt DC intermediate circuit and/or bidirectional converter to a 24-volt ring network and a 24-volt battery having a receptacle for 220 volts, 50 Hz voltage.

OBJECTS OF THE INVENTION

One object of the present invention is to provide a second onboard electrical system voltage as inexpensively as possible with respect to hardware and software.

SUMMARY OF THE INVENTION

According to one formulation of the invention, this and other objects are achieved by the onboard electrical system of the present invention, which includes a switching or connection device with only one step-up switching regulator.

The onboard electrical system, utilizing the switching or connection device and the step-up switching regulator, both charges a start capacitor with an appropriately high voltage and supplies a second onboard electrical subsystem with voltage from the battery. Furthermore, while the starter-generator is in generator mode, the onboard electrical system regulates a converter assigned to the starter-generator through appropriate regulation of the converter to supply the second onboard electrical system with a voltage which is higher than the battery voltage and which is stepped down with respect to the voltage of the starter-generator. Advantageously, the start capacitor is then employed in generator mode as an intermediate circuit capacitor.

The electrical switching or connecting device comprises particularly inexpensive switching technology. Structurally, the electrical switching or connecting device consists of three connections. The first connection is between the first onboard electrical subsystem and the third onboard subsystem with blocking in the return direction. The second connection is between the first onboard electrical subsystem and the second onboard electrical subsystem with blocking in the return direction, and the second connection is enabled only during supply of power from the first onboard electrical subsystem to the second onboard electrical subsystem. The third connection is between the third onboard electrical subsystem and the second onboard electrical subsystem, and is enabled only during supply of power from the third onboard electrical subsystem to the second onboard electrical subsystem. Advantageously, diodes are provided for blocking the electrical path in the return direction. Also advantageously, a thyristor or transistor, in particular an IGBT, is provided for controlling (on/off switching) the individual switchable connections.

With slight additional switching and control technology expenditure, a recharging or supply of the first onboard electrical subsystem from the starter-generator can be achieved in generator mode of operation, whereby the first onboard electrical subsystem is connected to the second onboard electrical subsystem via a step-down switching regulator. In this case, power flow occurs from the starter-generator, through the converter with the intermediate circuit capacitor, and across the connection between the third onboard electrical subsystem and the second onboard electrical subsystem. The subsequent connection of the second onboard electrical subsystem occurs across the step-down switching regulator to the first onboard electrical subsystem. The starter capacitor, provided for starting the starter-generator, is used as the intermediate circuit capacitor.

BRIEF DESCRIPTION OF THE DRAWINGS

The present invention as well as additional advantageous refinements of the present invention are explained in greater detail below with the aid of an exemplary embodiment schematically depicted in the drawing, in which:

FIG. 1 shows, by way of example, an onboard electrical system for a vehicle with a first onboard electrical subsystem on the battery side, a second onboard electrical subsystem for supplying high-current consuming components with voltage that is elevated in comparison with the battery voltage, and a third onboard electrical subsystem connected to a starter-generator that is coupled to the internal combustion engine of the vehicle.

DETAILED DESCRIPTION OF THE PREFERRED EMBODIMENTS

The onboard electrical system depicted in FIG. 1 can basically be divided into a first onboard electrical subsystem OES1 with a voltage level of, for example, 12 volts corresponding to the voltage of battery B; a second onboard electrical subsystem OES2 for supplying high-current consuming components with a voltage level of, for example, 180 volts; and a third onboard electrical subsystem OES3 with a voltage level of, for example, 400 volts. The third onboard electrical subsystem OES3 charges a start capacitor CAP, used for starting an internal combustion engine ICE by means of a starter-generator SG. The starter-generator SG is supplied by a converter CONV. Furthermore, while the starter-generator SG is in the generator mode, the third onboard electrical subsystem OES3 additionally serves to adapt its output voltage to the voltage level of the second onboard electrical subsystem OES2, by means of a voltage level of approximately 180 volts regulated through converter CONV. Energy-optimated operation of the starter-generator SG (serving here as an asynchronous motor, preferably with a squirrel-cage rotor) is controlled by a regulator.

There is an electrical switching or connection device C1–C3 having a first connection C1 between the first onboard electrical subsystem OES1 and the third onboard electrical subsystem OES3 which blocks the electrical path in the return direction, and a second connection C2 between the first onboard electrical subsystem OES1 and the second onboard electrical subsystem OES2. The second connection is enabled only during supply of power from the first onboard electrical subsystem OES1 to the second onboard electrical subsystem OES2. The electrical switching or connection device C1–C3 also has a third connection C3 between the third onboard electrical subsystem OES3 and the second onboard electrical subsystem OES2 that is enabled only during the supply of power from the third onboard electrical subsystem OES3 to the second onboard electrical subsystem OES2.

In preparation to start the internal combustion engine ICE through a starter-generator SG, which then functions as an asynchronous motor, a start capacitor CAP in the third onboard electrical subsystem OES3 is charged. For example, following activation of the ignition key the start capacitor CAP is charged to a voltage of approximately 400 volts from the battery B with the help of a step-up switching regulator SUSR (DC-DC converter) across connection C1. Switch S1 and/or S2 in connection C2 and/or C3 is open during this charging phase of the start capacitor CAP. Connection C1 is blocked in the return direction to battery B by diode D1 in connection C1.

Following the above-described operation of start capacitor CAP, a second onboard electrical subsystem OES2 can be brought to the second onboard electrical system voltage of, for example, 180 volts, through the closing of switch S2 in connection C2 by means of the step-up switching regulator SUSR and is provided with energy from battery B. Diode D1 remains in a blocked state since start capacitor CAP, as a rule, is at a voltage level which is above the voltage level of second onboard electrical subsystem OES2.

With the help of the asynchronous motor of starter-generator SG during the actual start operation, internal combustion engine ICE can be run up to a rotational speed of approximately 400 to 700 rpm (in the case of electronic valve control, the valves are fully opened during the power-up and are therefore made compressionless). As soon as internal combustion engine ICE has attained a predetermined rotational speed or the required angle of rotation of its cam shaft, internal combustion engine ICE can be ignited in normal valve position and starter-generator SG can be switched off on the drive side. If the voltage level of the third onboard electrical subsystem OES3 is lower than the voltage level of the second onboard electrical subsystem OES2 and the energy stored in start capacitor CAP is not sufficient for the starting operation, additional energy can be drawn from battery B across step-up switching regulator SUSR and connection C1 for starter-generator SG (supplied via converter CONV).

Following the ignition of internal combustion engine ICE, starter-generator SG can pass into generator mode. The voltage level of the third onboard electrical subsystem OES3 is regulated as an intermediate circuit voltage via converter CONV, and start capacitor CAP (which is advantageously used as an intermediate circuit capacitor) is regulated to the voltage level of the second onboard electrical subsystem OES2 of, for example, 180 volts. After attainment of the voltage level of onboard electrical subsystem OES2, switch S2 is opened and thus connection C2 is interrupted and switch S1 is closed and thus connection C3 of the onboard electrical subsystem OES3 to the onboard electrical subsystem OES2 is established. At this point, step-up switching regulator SUSR is advantageously disabled. Starter-generator SG now functions in generator mode and supplies onboard electrical subsystem OES2 and the high-current consuming components connected thereto via the regulated intermediate circuit voltage of onboard electrical subsystem OES3.

By means of a fourth connection C4 provided according to one embodiment of the invention, the second onboard electrical subsystem OES2 is connected via a step-down switching regulator SDSR (DC-DC converter) to the first onboard electrical subsystem OES1. In this manner, the starter-generator SG, when in the generator mode, recharges battery B with a voltage stepped down via step-down switching regulator SDSR to its voltage level and preferably also supplies voltage to the components of this voltage level.

In order for the starter-generator SG to work in generator mode with the greatest possible degree of efficiency and thus with the least possible load on the energy storage or energy supply, the electrical losses both in converter CONV as well as in the asynchronous motor provided for starter-generator SG are held to a low level. To accomplish this, the interior moment $M_{i1}$ of the asynchronous machine of starter-generator SG is set in a field-oriented regulator FOR according to the principle of optimal-loss control and/or regulation of the rotor flux through corresponding adaptation of magnetizing current $i_\mu'$ depending on an effective current $i_{sq}$ determined based on the particular corresponding drive torque.

Field-oriented or rotor-flux-oriented vector current regulation of an asynchronous motor is known and is discussed, for example, in the book *Steuerverfahren für Drehstrommaschinen* [Control Processes for Three-Phase Motors] by H. Späth, Springer-Verlag, 1983.

Field-oriented control of the asynchronous motor assumes the mathematical description of the dynamic motor behavior with space vector values. Field orientation means that the freely selectable reference axis of this mathematical motor model with respect to its angular position has a fixed connection with the rotor flux space vector, the stator flux space vector, or the air-gap space vector. The mathematically simplest machine structure and thus also the simplest structure for a controller are obtained if the rotor flux space vector is selected as the orientation variable. The structure of the motor, with the stator flux space vector given, is equal to that of an externally excited compensated direct current motor. Field-oriented control of the asynchronous motor is achieved in that the components of the stator flux vector of the motor depicted in the field-oriented coordinate system are specified as control or regulating variables. By means of a simple decoupling, the value of the flux space vector and the internal torque can be controlled independent of each other.

Internal torque $M_{i1}$ is then determined similarly as in the case of the regulation of a direct-current motor from the product of effective current $i_{sq}$ and adapted magnetization current $i_\mu'$, and a torque sensitivity constant $K_1$, as in the following equation:

$$M_{i1} = K_1 \cdot i_{sq} \cdot i_\mu'$$

The losses of an asynchronous machine can be specified as follows:

$$P_V = P_{VCU} + P_{VFe}$$

$$P_V = \left[ R_S + R_{Fe} \cdot h \cdot \frac{f_S}{f_{Sn}} + R_{Fe} \cdot (1-h) \cdot \left(\frac{f_S}{f_{Sn}}\right)^2 \right] \cdot$$

-continued $$(i''_\mu)^2 + (R_s + R'_R) \cdot \left(\frac{M_{il}}{K_l}\right)^2 \cdot \frac{1}{(i'_\mu)^2}$$

Where:
- $R_S$=Stator resistance
- $R_R'$=Rotor resistance converted to the stator
- $R_{Fe}$=Core loss resistance
- h=Factor for hysteresis losses
- 1−h=Factor for eddy current losses
- $f_S$=Stator frequency
- $f_{Sn}$=Stator nominal frequency The optimal magnetizing current in the sense of a minimum loss is obtained according to the following relationships:

$$\frac{\delta P_V}{\delta i'_\mu} = 0$$

$$i'_\mu = \sqrt[4]{\frac{R_S + R_R}{R_S + R_{Fe} \cdot h \cdot \left(\frac{f_s}{f_{Sn}}\right) + R_{Fe} \cdot (1-h) \cdot \left(\frac{f_s}{f_{Sn}}\right)^2}} \cdot \sqrt{\frac{M_{il}}{K_l}}$$

$$i''_{\mu opt} = \sqrt[2]{\frac{R_S + R_R}{R_S + R_{Fe} \cdot h \cdot \left(\frac{f_s}{f_{Sn}}\right) + R_{Fe} \cdot (1-h) \cdot \left(\frac{f_s}{f_{Sn}}\right)^2}} \cdot i_{sq}$$

In order to define the active current $i_{sq}$, which determines the particular internal moment $M_{i1}$, one first obtains the difference between the actual value $V_{2\ actual}$ of the intermediate circuit voltage according to the voltage level of second onboard electrical subsystem OES2 and the target value $V_{2\ target}$ of this intermediate circuit voltage. Then, the corresponding active current $i_{sq}$ is defined in a PI generator. The corresponding magnetizing current $i_\mu'$ is determined in accordance with the particular active current $i_{sq}$ utilizing the above formulas by the principle of loss-optimal field-oriented regulation under consideration of the particular stator frequency $f_S$ in a frequency adapter FA. Then, the converter CONV and thus the asynchronous motor of stator-generator SG are driven via field-oriented regulator FOR.

According to a further embodiment of the invention, magnetization current $i_\mu'$ additionally is set on the basis of a limiter L so that the magnetization current at a relatively high rotational speed can be limited, in particular to prevent thermal overload, by means of a weakening of the field. The limiter L in this embodiment limits the magnetization current $i_\mu'$ on the basis of the rotational speed n of the asynchronous motor, which, as shown in the Figure, is supplied to the limiter L by a sensor S that detects the rotational speed of the crankshaft of the internal combustion engine ICE.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. An onboard electrical system for a vehicle, comprising:
    a starter-generator;
    a first onboard electrical subsystem supplying power to low-voltage components of the vehicle;
    a second onboard electrical subsystem supplying power to higher-voltage components of the vehicle;
    a third onboard electrical subsystem for a starter mode and a generator mode of the starter-generator; and
    an electrical connecting device, wherein the first onboard electrical subsystem is switchably brought into supply connection across a step-up switching regulator to the second onboard electrical subsystem or to the third onboard electrical subsystem for the starter mode of the starter-generator, and wherein the third onboard electrical subsystem is switchably brought into supply connection with the second onboard electrical subsystem during the generator mode of the starter-generator.

2. The onboard electrical system according to claim 1, wherein the first onboard electrical subsystem is supplied by a vehicle battery.

3. The onboard electrical system according to claim 1, wherein the starter-generator is coupled with an internal combustion engine.

4. The onboard electrical system according to claim 1, wherein the electrical connecting device comprises:
    a first connection between the first onboard electrical subsystem and the third onboard electrical subsystem, wherein the first connection has a blocked electrical path in a return direction from the third onboard electrical subsystem to the first onboard electrical subsystem;
    a second connection between the first onboard electrical subsystem and the second onboard electrical subsystem, wherein the second connection is enabled only during supply of power from the first onboard electrical subsystem to the second onboard electrical subsystem; and
    a third connection between the third onboard electrical subsystem and the second onboard electrical subsystem, wherein the third connection is enabled only during supply of power from the third onboard electrical subsystem to the second onboard electrical subsystem.

5. The onboard electrical system according to claim 1, wherein the starter-generator supplies the first onboard electrical subsystem across the second onboard electrical subsystem in the generator mode.

6. The onboard electrical system according to claim 5, further comprising:
    a fourth connection between the second onboard electrical subsystem and the first onboard electrical subsystem across a step-down switching regulator.

7. The onboard electrical system according to claim 1, wherein the third onboard electrical subsystem further comprises:
    a converter connected to the starter-generator.

8. The onboard electrical system according to claim 1, wherein the third onboard electrical subsystem further comprises:
    a start capacitor connected to the starter-generator.

9. The onboard electrical system according to claim 7, wherein the third onboard electrical subsystem further comprises:
    a start capacitor connected to the starter-generator, wherein the start capacitor is an intermediate circuit capacitor of the converter during the generator mode of the starter-generator.

10. The onboard electrical system according to claim 1, wherein the starter-generator is a rotor-flux-oriented, regulated asynchronous motor.

11. The onboard electrical system according to claim 10, wherein an internal moment ($M_i$) of the asynchronous motor is regulated, according to a principle of loss-optimized adaptation of a magnetizing current ($i_\mu'$), as a function of (i) a target value active current ($i_W$) which corresponds to a particular required drive torque and (ii) a stator frequency ($f_S$), wherein regulation of the internal moment ($M_i$) is expressed as:

$$M_i = K_1 \cdot i_w \cdot i_\mu'$$

wherein $K_1$ represents a torque sensitivity constant of the asynchronous motor.

12. The onboard electrical system according to claim 11, further comprising:

a limiter for limiting the magnetization current ($i_\mu'$) dependent upon the rotational speed (n) of the asynchronous motor.

13. An onboard electrical system for a vehicle, comprising:

a vehicle battery;

a starter-generator electrically downstream of the battery;

a step-up switching regulator electrically downstream of the battery;

a first onboard electrical subsystem electrically downstream of the battery;

a second onboard electrical subsystem electrically downstream of the battery;

a third onboard electrical subsystem electrically between the battery and the starter-generator;

a first connection electrically between the first subsystem and the third subsystem;

a second connection electrically between the first subsystem and the second subsystem; and a third connection electrically between the third subsystem and the second subsystem.

14. The onboard electrical system according to claim 13, further comprising:

at least one low voltage component;

wherein the first subsystem is electrically between the battery and the low voltage component.

15. The onboard electrical system according to claim 13, further comprising:

at least one high voltage component;

wherein the second subsystem is electrically between the step-up switching regulator and the high voltage component.

16. The onboard electrical system according to claim 13, wherein the third subsystem is electrically between the step-up switching regulator and the starter-generator.

17. The onboard electrical system according to claim 13, wherein the step-up switching regulator is the only step-up switching regulator in the onboard electrical system.

18. The onboard electrical system according to claim 13, further comprising a diode electrically between the first subsystem and the third subsystem, wherein the diode blocks an electrical path from the third subsystem to the first subsystem.

19. The onboard electrical system according to claim 13, further comprising a diode electrically between the first subsystem and the second subsystem, wherein the diode blocks an electrical path from the second subsystem to the first subsystem.

20. The onboard electrical system according to claim 13, wherein the second connection comprises a switch that forms a closed electrical path only when power is supplied from the first subsystem to the second subsystem.

21. The onboard electrical system according to claim 13, wherein the third connection comprises a switch that forms a closed electrical path only when power is supplied from the third subsystem to the second subsystem.

22. The onboard electrical system according to claim 13, further comprising:

a step-down switching regulator electrically between the second subsystem and the first subsystem.

23. The onboard electrical system according to claim 13, further comprising:

a converter electrically between the third subsystem and the starter-generator.

24. The onboard electrical system according to claim 23, wherein the third subsystem comprises:

a start capacitor electrically connected to the starter-generator via the converter, wherein the start capacitor is an intermediate circuit capacitor of the converter during a generator mode of the starter-generator.

* * * * *